(No Model.)
M. WALLACE.
NUT LOCK.
No. 260,628. Patented July 4, 1882.
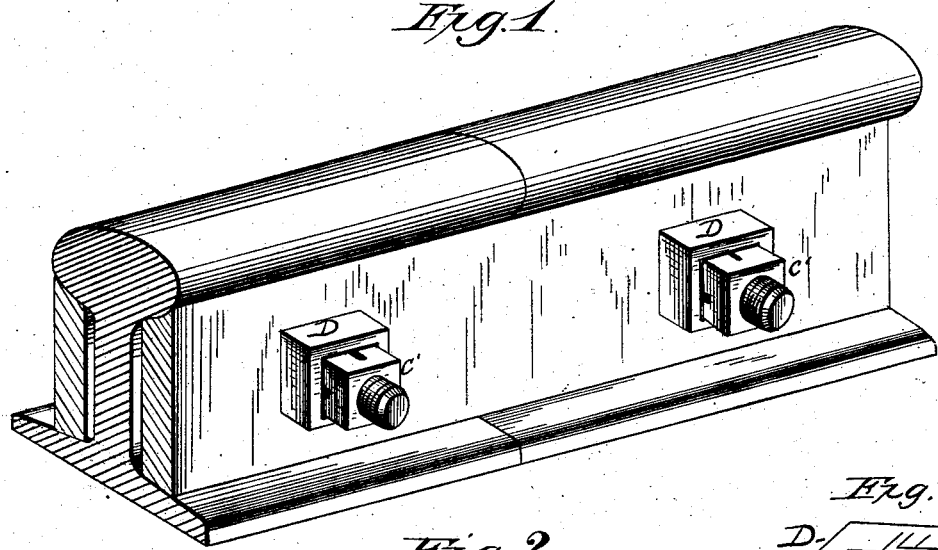
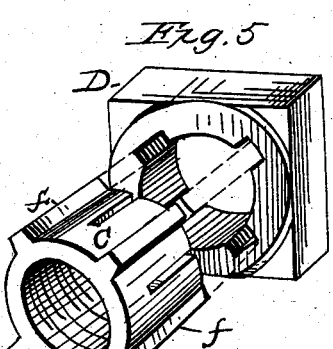
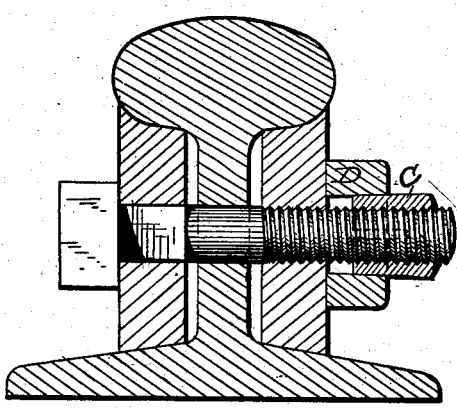
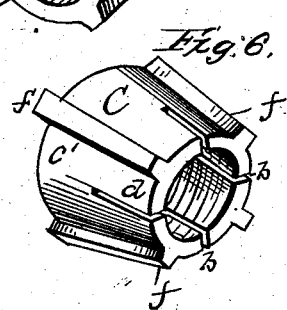
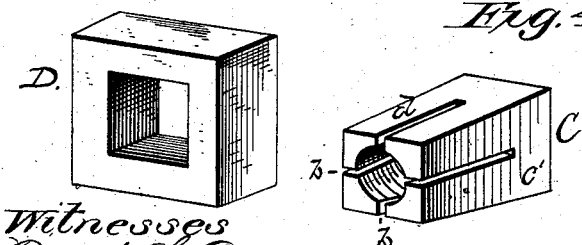
Witnesses
Franck L. Ourand
George U. Rose Jr.
Inventor
Marshal Wallace,
by Heylmunt & Kane,
Attorneys.

UNITED STATES PATENT OFFICE.

MARSHAL WALLACE, OF LITTLE ROCK, ARKANSAS, ASSIGNOR OF ONE-HALF TO DUDLEY E. JONES, OF SAME PLACE.

NUT-LOCK.

SPECIFICATION forming part of Letters Patent No. 260,628, dated July 4, 1882.

Application filed March 20, 1882. (No model.)

*To all whom it may concern:*

Be it known that I, MARSHAL WALLACE, a citizen of the United States of America, residing at Little Rock, in the county of Pulaski and State of Arkansas, have invented certain new and useful Improvements in Nut-Locks; and I do hereby declare the following to be a full, clear, and exact description of the invention, such as will enable others skilled in the art to which it appertains to make and use the same.

My invention relates to certain improvements in that class of nut-locks in which a slotted nut and a clamping-collar are employed to lock the nut in position upon the bolt. Several attempts have heretofore been made in this direction to lock firmly a nut upon the bolt, but as yet, so far as I am informed and able to judge, they have not been successful, for the reason that the jarring or vibrating of the rails and their adjuncts by passing rolling-stock causes the nuts to work off their bolts in a short time. The object of my improvements is to obviate this serious difficulty, and to bind automatically, so to speak, the screw-threads of the slotted portion of a tapering nut upon the screw-threads of the bolt, and thus to prevent the working off of the nut.

My improvements consist in the novel construction and combination of parts, as will be hereinafter more fully set forth and specifically claimed.

In the accompanying drawings, making a part of this specification, Figure 1 is a perspective view of portions of two adjacent rails and fish-plates attached to show my improved nut-lock applied thereto. Fig. 2 is a vertical cross-sectional view of the same. Fig. 3 is a perspective view of the clamping collar or lock which fits over and locks the end of the nut. Fig. 4 is a perspective view of an elongated tapering and slotted or incised nut; and Figs. 5 and 6 are perspective views of nut and a clamping-lock formed with elevations and recesses, respectively.

The accompanying drawings show the practical application of my improvements to railroad-rails.

The letter C (see Figs. 4 and 6) represents my improved nut, which tapers from end to end and is constructed at the small end with one or more slots or incisions, b, which extend in the direction of the length of the nut, substantially as shown. These slots may be sawed in the nut or formed by any other suitable means. This construction divides the nut into two sections—the solid portion c' and the slotted portions d—the object being to permit the end or portion d to be compressed and yield under pressure and to resume its normal position when the pressure is removed. It is essential that the nut be made angular exteriorly and tapering in the direction of its length, but its cross-section can be made of any form except round.

The letter D (see Figs. 3 and 5) represents the collar or lock for the nut, and is made of good strong metal, formed with a tapering and angular opening through it. The opening of this lock is of a corresponding shape to the exterior of the nut, and adapted to fit the small end, and taper as the nut, and is non-circular or with sufficient angles to keep it from turning on the nut.

By reference to Figs. 5 and 6 of the drawings it will be observed that the exterior of the nut is provided with a series of elevations, forming ribs or flanges f, extending in the direction of the length of the nut and conforming to the taper thereof, and the locking-collar D is formed with the same number of recesses or slots, fitting the ribs or flanges of the nut, as indicated in Fig. 5 of the drawings. Further, in order to secure the full benefit of the lock, the nut C should never reach quite through the lock D, or, in other words, should not touch the object to be confined. This relative arrangement of the nut and lock is important, especially when the device is used on railroad-rails, since, owing to the vibration of the rails consequent to the pressure upon them by the rolling-stock, the locking-nut, being in contact with the fish-plate, is pressed outward, owing to the taper of the collar, thereby compressing the slotted portion of the nut, and forces the screw-threads of the nut into the screw-threads of the bolt. This effectually prevents the nut from working off, since the inner end does not touch the object, and the pressure against the lock will hold it in place.

The operation and application of my improved nut and collar or clamp are effected as follows:

The collar or clamp D is slipped tightly on the small end of the nut C, and the two pieces are then turned on the bolt. As the clamp or lock D comes in contact with the object to be secured, and as the screw-nut progresses on the bolt, the sections $d$ of the nut C are compressed into the screw-threads of the bolt, at the same time the nut C is slowly moving forward into the opening in the lock D and making a perfect nut-clamp. The harder the nut is turned the stronger is the compression on the bolt and the farther and tighter will the nut be forced into the clamp, so that a strong pressure on the wrench will be required to remove the nut from the bolt. This compression of the screw-threads of the nut into or on the screw-threads of the bolt, instead of pressure against the object to be secured, only, as in the ordinary nut, not only prevents the nut from working loose, but by it almost the entire strength of the bolt is secured, as against only the strength of the threads in the common method of nut-locks and the danger of slipping the threads is entirely obviated.

My improved nut-lock can be applied to bolts used in buildings, bridges, and elsewhere, and in structures or objects liable to shrink or decay. All that is necessary to secure the full benefit of the nut is to turn it home as the defects in the structure or object are discovered.

It will be observed that my improved lock is automatic—that is, as the screw-nut is turned in the direction of the object to be held in place the clamp or lock is forced against the object and the nut slides into the lock-collar, thus contracting the slots and compressing the screw-threads of the nut into those of the bolt.

What I claim as my invention, and desire to secure by Letters Patent, is—

1. A nut-lock consisting of the nut C, the exterior of which is tapering and non-circular, as described, and formed at the smaller end with two or more slots extending in the direction of the length of the nut, and the clamping-collar D, with a corresponding tapering and non-circular opening, adapted to fit over the smaller end of the nut, said parts being combined for the joint operation, as stated.

2. The combination, with a bolt, of the tapering nut C, having slots or incisions $b$ at the smaller end, clamping-collar D, fitting on the nut, and means for causing the nut to turn by turning the collar, whereby the collar compresses the incised parts against the threads of the bolt when in contact with the material to be bolted to lock the nut from working loose, as set forth.

In testimony whereof I affix my signature in presence of two witnesses.

MARSHAL WALLACE.

Witnesses:
C. R. SCHAER,
ROBT. HAMILTON.